(12) United States Patent
Hornbach et al.

(10) Patent No.: US 9,739,172 B2
(45) Date of Patent: Aug. 22, 2017

(54) BEARING HOUSING OF AN EXHAUST-GAS TURBOCHARGER

(75) Inventors: Johannes Hornbach, Frankenthal (DE); Martin Becker, Maisch (DE)

(73) Assignee: BorgWarner Inc., Auburn Hills, MI (US)

( * ) Notice: Subject to any disclaimer, the term of this patent is extended or adjusted under 35 U.S.C. 154(b) by 944 days.

(21) Appl. No.: 13/816,518

(22) PCT Filed: Aug. 18, 2011

(86) PCT No.: PCT/US2011/048229
§ 371 (c)(1),
(2), (4) Date: Feb. 12, 2013

(87) PCT Pub. No.: WO2012/027188
PCT Pub. Date: Mar. 1, 2012

(65) Prior Publication Data
US 2013/0142647 A1 Jun. 6, 2013

(30) Foreign Application Priority Data
Aug. 24, 2010 (DE) .......... 10 2010 035 280

(51) Int. Cl.
*F01D 25/16* (2006.01)
*F01D 25/24* (2006.01)
(Continued)

(52) U.S. Cl.
CPC .............. *F01D 25/16* (2013.01); *B23P 17/00* (2013.01); *F01D 25/162* (2013.01); *F01D 25/24* (2013.01);
(Continued)

(58) Field of Classification Search
CPC ........ F01D 28/16; F01D 28/18; F01D 28/162; F01D 28/20; F01D 28/125; F04D 29/05; F04D 29/063
See application file for complete search history.

(56) References Cited

U.S. PATENT DOCUMENTS 5,028,208 A * 7/1991 Mitsubori ............. F01D 17/165
415/150
6,415,846 B1 * 7/2002 O'Hara ..................... B22C 9/22
164/137
(Continued)

FOREIGN PATENT DOCUMENTS

CH        DE 4330380 A1 * 3/1995 ........... F01D 25/125

*Primary Examiner* — Gregory Anderson
*Assistant Examiner* — Juan G Flores
(74) *Attorney, Agent, or Firm* — Eric L. Doyle; Stephan A. Pendorf; Patent Central LLC

(57) ABSTRACT

A bearing housing (1) of an exhaust-gas turbocharger, having a compressor-side housing flange (2), a central housing section (3) which is integrally connected to the housing flange (2) and in which a first partial section (4) of an oil chamber (5) is arranged; and a turbine-side housing section (6) which has a turbine-side housing flange (7) and in which a second partial section (8) of the oil chamber (5) is formed. The central housing section (3) and the turbine-side housing section (6) are formed in one piece. A bearing housing (9) which forms a separate component is inserted into the central housing section (3) and into the turbine-side housing section (6), with these delimiting the oil chamber (5).

7 Claims, 5 Drawing Sheets

(51) Int. Cl.
  *F02C 6/12* (2006.01)
  *B23P 17/00* (2006.01)
  *F16C 35/02* (2006.01)
  *F16C 17/18* (2006.01)

(52) U.S. Cl.
  CPC ............ *F02C 6/12* (2013.01); *F05D 2220/40* (2013.01); *F05D 2230/51* (2013.01); *F05D 2240/54* (2013.01); *F16C 17/18* (2013.01); *F16C 35/02* (2013.01); *F16C 2360/24* (2013.01); *Y10T 29/49988* (2015.01)

(56) References Cited

U.S. PATENT DOCUMENTS

| | | | |
|---|---|---|---|
| 6,793,468 B2 * | 9/2004 | Ojima | F01D 25/166 148/434 |
| 7,108,488 B2 * | 9/2006 | Larue | F16C 17/024 384/103 |
| 7,517,154 B2 * | 4/2009 | McKeirnan, Jr. | F01D 25/16 384/517 |
| 7,832,938 B2 * | 11/2010 | McKeirnan, Jr. | F16C 35/077 384/504 |
| 8,790,066 B2 * | 7/2014 | Gutknecht | F01D 25/16 415/1 |
| 2008/0019629 A1 * | 1/2008 | McKeirnan | F16C 35/077 384/493 |
| 2011/0176907 A1 * | 7/2011 | Groves | F01D 25/166 415/1 |

\* cited by examiner

BEARING HOUSING OF AN EXHAUST-GAS TURBOCHARGER

The invention relates to a bearing housing of an exhaust-gas turbocharger according to the preamble of claim 1.

A bearing housing of said type is known from DE 43 30 380 A1. The known bearing housing is divided into a bearing insert and a bearing dish which at least partially surrounds the bearing insert. Here, an oil chamber for cooling the bearings of the bearing housing is formed in the bearing insert, which is a cast part. Even though it is sought by means of said arrangement to attain a simplification in design and manufacture, the design of the bearing insert with the oil chamber is nevertheless cumbersome because it results in a relatively complicated geometry which cannot be manufactured easily by casting.

It is therefore an object of the present invention to provide a bearing housing of an exhaust-gas turbocharger according to the preamble of claim 1 which is of simpler construction and easier to manufacture than known designs.

Said object is achieved by means of the features of claim 1.

Since, in contrast to the generic prior art, the central housing section and the turbine-side housing section are combined to form a single-piece component, it is possible for the internal geometry of said component to be considerably simplified, in particular with regard to the provision of a free space for the oil chamber, because the oil chamber is closed off by the bearing sleeve which is a separate component which, after its manufacture, need merely be inserted into the structural unit composed of the central housing section and the turbine-side housing section. During the course of said insertion, the free space formed in the structural unit explained above is closed off by the bearing sleeve so as to form the oil chamber.

The subclaims relate to advantageous refinements of the invention.

In a particularly advantageous embodiment, a water chamber is provided, separately from the oil chamber, in the turbine-side housing section, which water chamber can likewise be closed off and thereby separated from the oil chamber, during the course of the insertion of the bearing sleeve.

Here, the bearing sleeve may be provided with the required oil inlet ducts during the course of its manufacture. The bearing bushes are arranged, so as to be rotatable or stationary, in the bearing sleeve.

The bearing sleeve is preferably a unipartite component. It is however also alternatively possible for the bearing sleeve to be divided into two sleeve parts which, in the assembled state, can be inserted in alignment one behind the other into the central housing section and the turbine-side housing section.

For a further simplification of the component geometry, the water chamber is preferably of semi-circular design and may conventionally be provided with two water ports. It is however alternatively possible here for only one water port to be provided in conjunction with an adapter port.

In addition to the bearing housing according to the invention, the present invention also encompasses a method for the manufacture of an exhaust-gas turbocharger bearing housing.

According to the invention, firstly a single-piece bearing housing shell is cast which is formed by the compressor-side housing flange, by the central housing section with its first partial section for the oil chamber and by the turbine-side housing section with its turbine-side housing flange and with the second partial section of the oil chamber. After the manufacture of said structural unit, the bearing sleeve is manufactured as a separate component which, after its production, is inserted into the bearing housing shell in order to complete the bearing housing according to the invention.

Said two-part design of the bearing housing according to the invention therefore yields the advantage of a considerable simplification of the method according to the invention because only simple internal geometries of the bearing housing shell need be manufactured by casting, which internal geometries, to complete the bearing housing in the region of the oil chamber and the water chamber which may be provided, close these during the course of the insertion. For manufacture of the bearing housing shell by casting, a combined inner core may be used which comprises the geometry of an oil core and that of a water core for producing the oil chamber and the water chamber respectively, if a water chamber is provided. As explained above, said two chambers are closed off and separated by the insertion of the bearing sleeve.

As a result of the new core design, minimum sizes of the water and oil chambers based on the minimum wall thickness of the sand cores can be undershot. Furthermore, core fluctuations relative to one another can be avoided, in contrast to conventional separate cores. The water core and the oil core can, on account of the sealing bearing sleeve, be extended closer to the bearing arrangement of the bearing housing.

It is also possible, by carrying out machining on the outer diameter of the bearing sleeve, for the cooling medium to be brought as close as possible to the locations to be cooled.

The stable sand core pack which is easy to locate in position during the casting process also offers the advantage that sand removal after the casting process is easy, since it is possible to eliminate long sand ducts which are difficult to reach.

In an alternative embodiment, for the least possible machining expenditure, it is also basically possible for the water chamber to be provided with only one access.

Further details, advantages and features of the invention will emerge from the following description of exemplary embodiments on the basis of the drawing, in which:

FIG. 1 shows a schematically slightly simplified illustration of a turbocharger body group which is provided with a bearing housing according to the invention, FIG. 2 shows a sectional illustration of the bearing housing according to the invention before the insertion of a bearing sleeve, FIG. 3 shows a perspective illustration of the bearing housing according to the invention after the insertion of the bearing sleeve and the assembly of a rotor, FIG. 4 shows a perspective simplified illustration of a known bearing housing design, FIG. 5 shows a perspective illustration of a core for forming the bearing housing according to FIG. 4, FIG. 6 shows an illustration, corresponding to FIG. 4, of a bearing housing according to the invention, FIG. 7 shows an illustration, corresponding to FIG. 5, of a core which can be used when carrying out the method according to the invention, FIG. 8 shows an illustration, corresponding to FIG. 7, of an alternative inner core, FIG. 9 shows a schematically highly simplified diagrammatic illustration of a water chamber produced by means of the core of FIG. 8, FIG. 10 shows an illustration, corresponding to FIG. 1, of a part of an alternative embodiment of the bearing housing according to the invention, and FIG. 11 shows a perspective illustration of said part of the alternative embodiment of the bearing housing according to the invention.

FIG. 1 illustrates an exhaust-gas turbocharger body group which has a bearing housing 1 according to the invention. The body group also includes a shaft 16 on which the compressor wheel 15 is mounted at one side and the turbine wheel 19 is mounted at the other side so as to form a rotor. The shaft 16 is mounted in the bearing housing 1 by means of a compressor-side bearing arrangement 17 and a turbine-side bearing arrangement 18 together with an axial bearing 22. If a compressor housing and a turbine housing, which are not illustrated in FIG. 1, are added to said body group, this yields an exhaust-gas turbocharger, such that the present invention can also be described as an exhaust-gas turbocharger with a bearing housing 1 to be described in detail below.

FIG. 2 illustrates the bearing housing 1 according to the invention before the insertion of a bearing sleeve 9. The bearing housing 1 comprises a compressor-side housing flange 2, a central housing section 3 which is integrally connected to the housing flange 2 and in which a first partial section 4 (see FIG. 1) of an oil chamber 5 is arranged, and a turbine-side housing section 6 which has a turbine-side housing flange 7 and in which a second partial section 8 (see FIG. 1) of the oil chamber 5 is arranged. The oil inlet 20 and the oil outlet 21 can also be seen from said illustration.

The central housing section 3 and the turbine-side housing section 6 are formed in one piece, and the bearing sleeve 9, which forms a separate component, is inserted in the central housing section 3 and turbine-side housing section 6. The advantage of said arrangement is that the bearing sleeve 9 and the two housing sections 3 and 6 together delimit the oil chamber 5.

It can also be seen from FIGS. 1 to 3 that the oil chamber 5 is separate from a water chamber 10 which is delimited by the turbine-side housing section 6 and by the bearing sleeve 9. As is also shown in FIG. 1, the bearing sleeve 9 is provided with oil inlet ducts 11, 12.

In an alternative embodiment, the bearing sleeve 9 may be divided into two sleeve parts which, in the assembled state, are inserted in alignment one behind the other in the central housing section 3 and the turbine-side housing section 6. FIG. 3 also shows the assembled rotor (compressor wheel 15, shaft 16 and turbine wheel 19) and water ports 13, 14 of the water chamber 10.

FIG. 4 shows a perspective illustration of a known bearing housing design LG, viewed from the direction of the turbine wheel. In this case, the bearing housing LG has a circular-ring-shaped water chamber WR with four water ports $WA_1$ to $WA_4$ and has an oil chamber OR.

Figure 1:
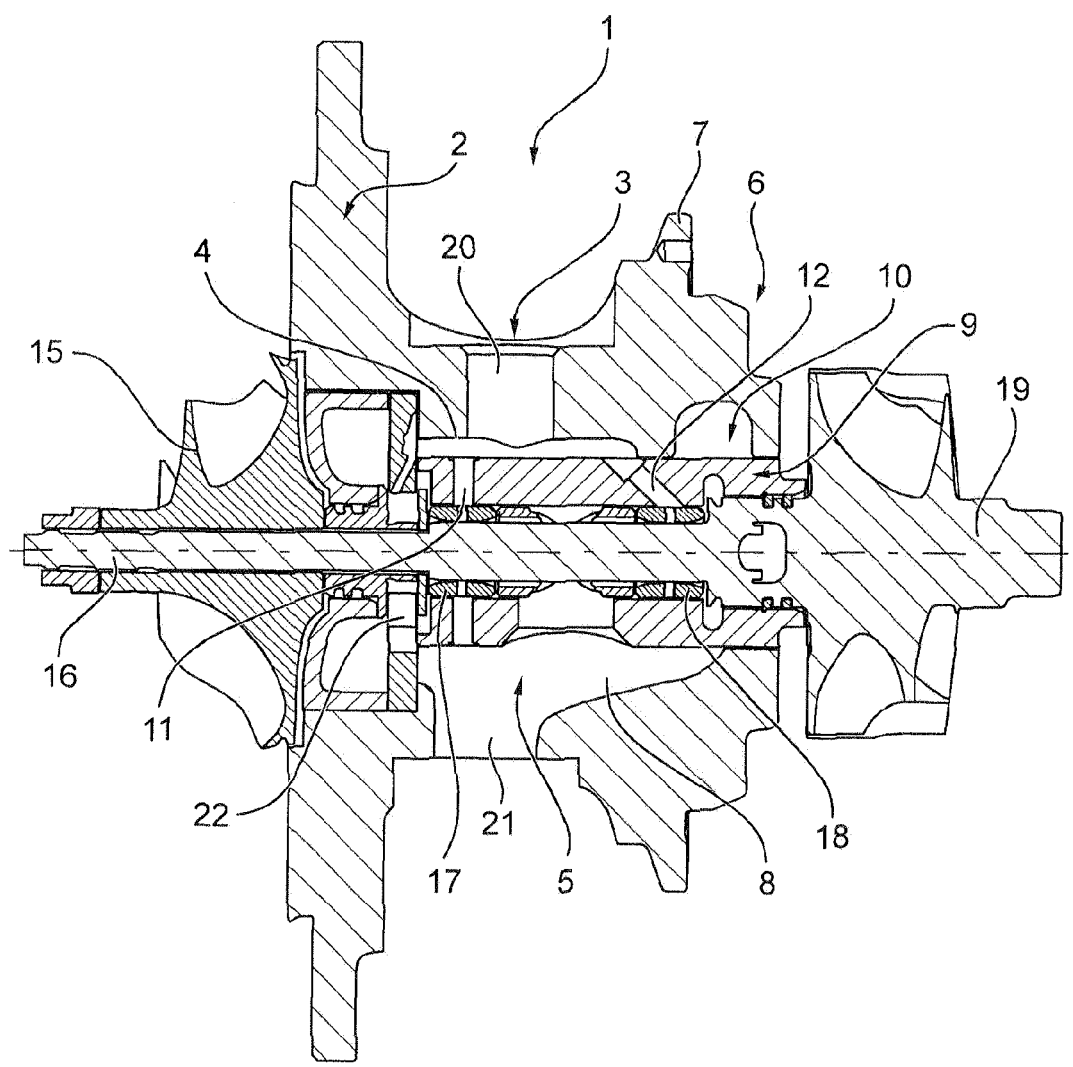
Figure 3:
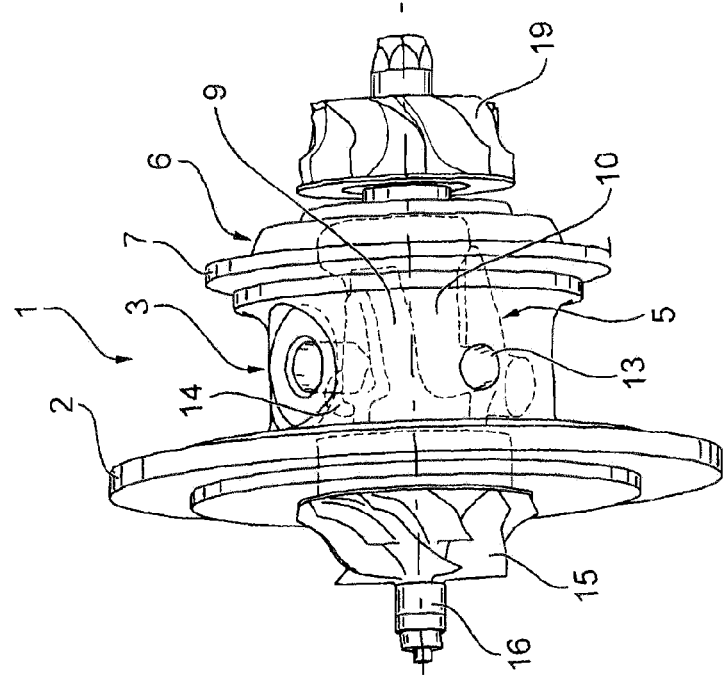
Figure 2:
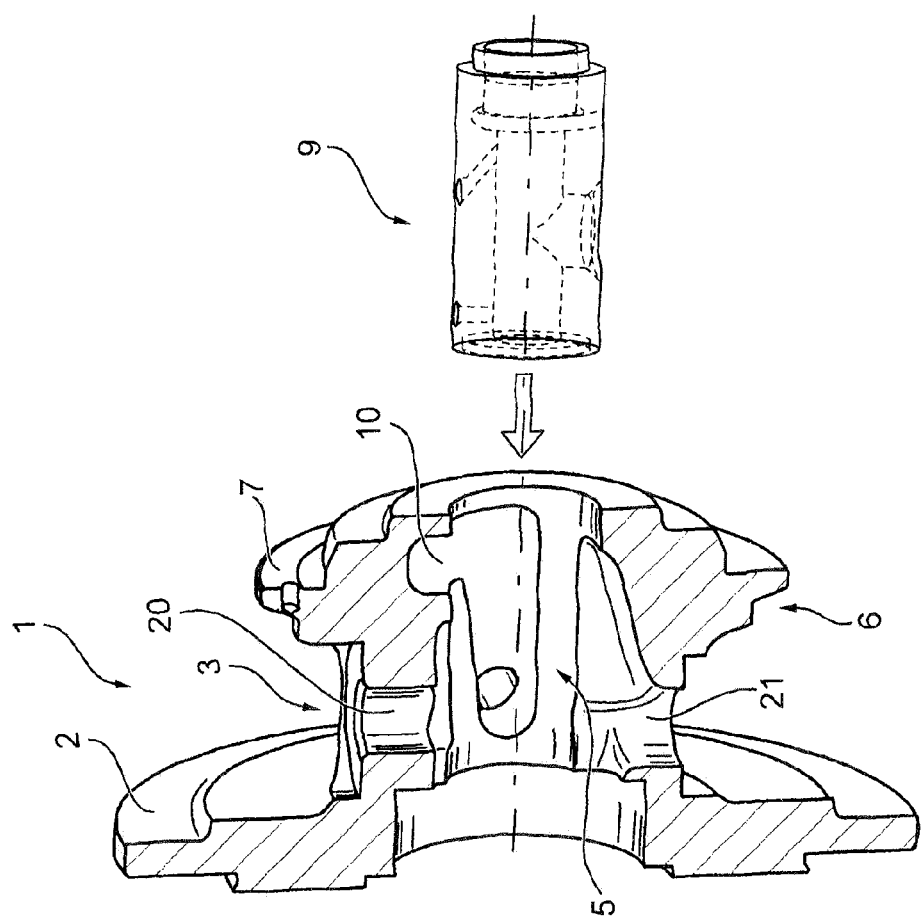
Figure 4:
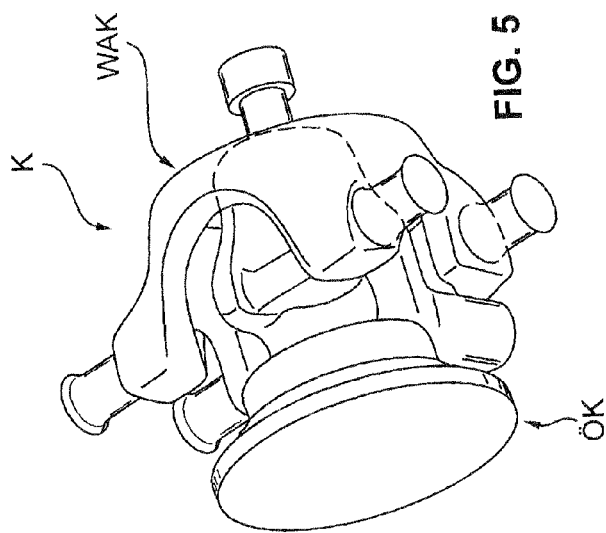
Figure 5:
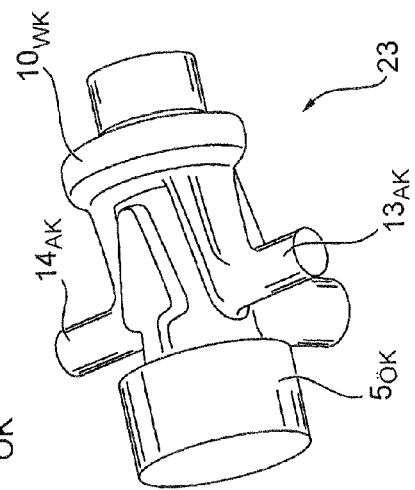
FIG. 5 shows a perspective illustration of a core K for manufacturing the water chamber WR and the oil chamber ÖR. For this purpose, the core has a water core WAK and an oil core ÖK which is combined with said water core.
Figure 6:
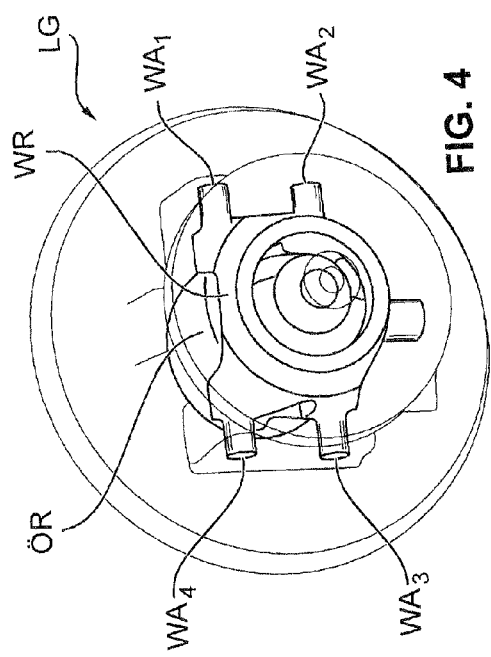

FIG. 6 shows the bearing housing 1 according to the invention, viewed again from the direction of the turbine wheel (not illustrated in FIG. 6). Here, FIG. 6 shows the semi-circular design of the water chamber 10 with, in contrast to the known embodiment of FIG. 4, only two water ports 13 and 14 and the oil chamber 5 which is separate from the water chamber 10.

Figure 7:
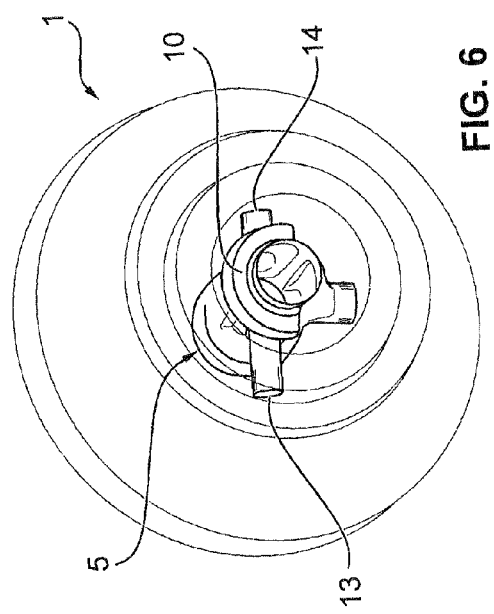

FIG. 7 shows a combined oil/water core 23 suitable for said housing design. Said core 23 has a water core $10_{WK}$ with two water port cores $13_{AK}$ and $14_{AK}$. Said water core $10_{WK}$ is combined with the oil core $5_{ÖK}$, as emerges in detail from FIG. 7.

The method according to the invention which can be carried out with the core 23 has the following method steps:
casting a single-piece bearing housing shell;
separately manufacturing the bearing sleeve 9; and
inserting the bearing sleeve 9 into the bearing housing shell.

The advantage of the method according to the invention is that, during the casting process, a single-piece bearing housing shell with a water chamber 10 and an oil chamber 5 is produced. As can be seen from FIG. 7, the combined oil/water core 23 is used to produce the oil chamber 5 and the water chamber 10. What has proven to be advantageous in this embodiment is the division into a water core $10_{WK}$, with the two water port cores $13_{AK}$, $14_{AK}$, and the oil core $5_{ÖK}$.

Figure 8:
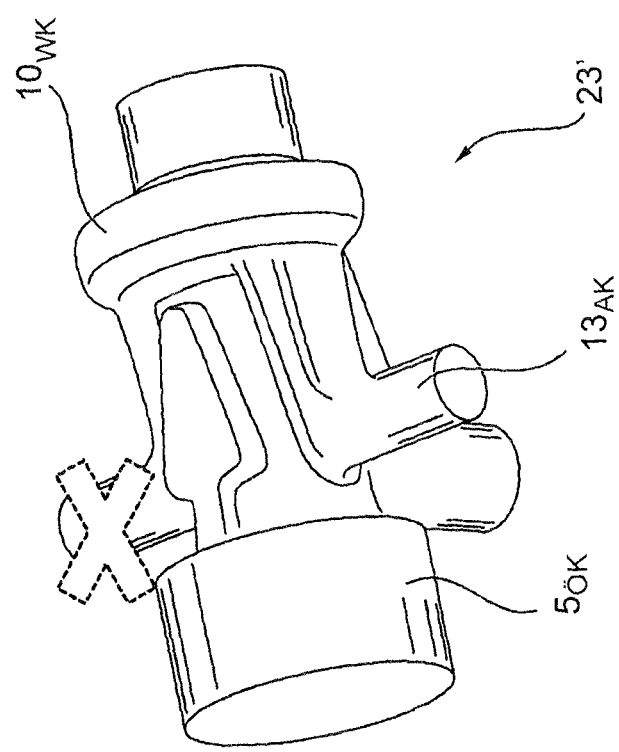

FIG. 8 illustrates an alternative core 23' in which the water core $10_{WK}$ has only one water port core $13_{AK}$.

Figure 9:
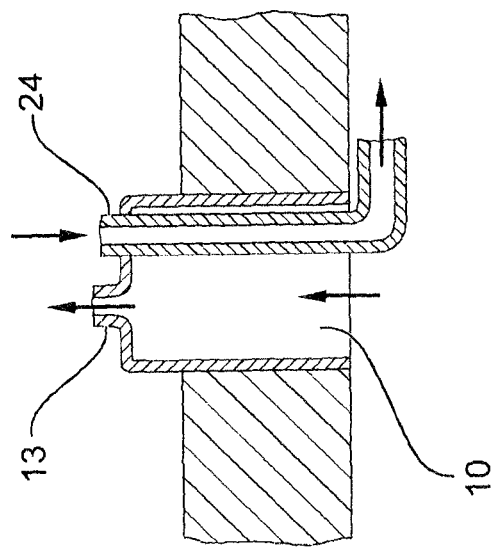

FIG. 9 shows a highly simplified diagrammatic illustration of the water port from FIG. 8, with the water inlet and outlet being combined to form one port by means of an adaptor port 24.

Figure 11:
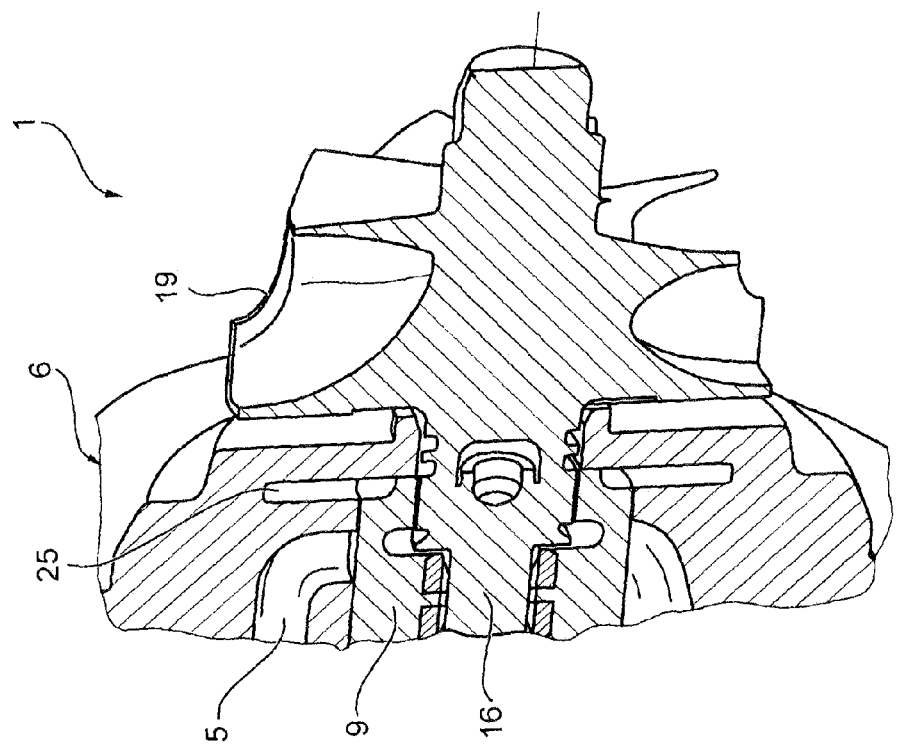
Figure 10:
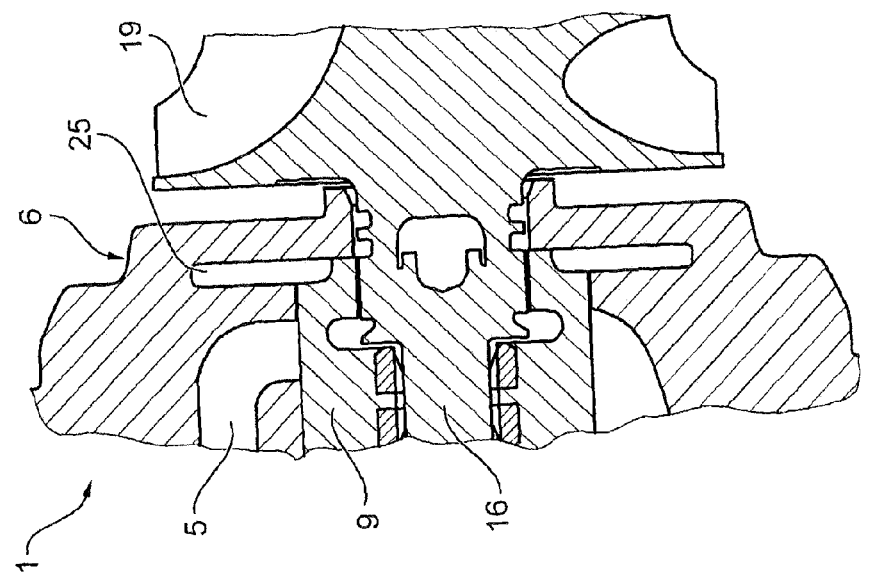

FIGS. 10 and 11 show an alternative embodiment of the bearing housing 1 according to the invention. Said embodiment has a heat decoupling chamber 25 which is arranged in the turbine-side housing section 6 and whose lower opening which points toward the shaft is closed off in the assembled state by the bearing sleeve 9, as can be seen in detail from the illustrations of FIGS. 10 and 11.

Here, FIG. 10 in particular shows that said heat decoupling chamber has a small axial extent in relation to its large radial extent. With said embodiment, it is possible for no water chamber to be provided.

To supplement the above written disclosure, reference is explicitly made to the diagrammatic illustration of the invention in FIGS. 1 to 11.

LIST OF REFERENCE SYMBOLS

1 Bearing housing
2 Compressor-side housing flange
3 Central housing section
4 First partial section
5 Oil chamber
$5_{ÖK}$ Oil core
6 Turbine-side housing section
7 Turbine-side housing flange
8 Second partial section
9 Bearing sleeve
10 Water chamber
$10_{WK}$ Water core
11, 12 Oil inlet ducts
13, 14 Water ports
$13_{AK}$ Water port core
$14_{AK}$ Water port core
15 Compressor wheel
16 Shaft
17 Bearing arrangement
18 Turbine-side bearing arrangement
19 Turbine wheel
20 Oil inlet
21 Oil outlet
22 Axial bearing
23 Combined oil/water core
23' Alternative core 24 Adapter port
25 Heat decoupling chamber
K Core
LG Bearing housing
ÖK Oil core
ÖR Oil chamber
WAK Water core
WR Water chamber
$WA_1$-$WA_4$ Water ports

The invention claimed is:

1. A bearing housing (1) of an exhaust-gas turbocharger, with
   a compressor-side housing flange (2),
   a turbine-side housing flange (7), and
   a central housing section (3) which is integrally connected to the compressor-side housing flange (2) and turbine-side housing flange (7), and in which an oil inlet bore (20) having a single inlet opening and a single outlet opening is arranged; wherein
      a bearing sleeve (9), having an outer circumferential surface, an inner cylindrical bore, and oil inflow ducts (11, 12), each oil inflow duct having a single inlet opening and a single outlet opening, as a separate component is inserted into the central housing section (3) and fixed against rotation
      an axially extending oil supply channel (4) in communication with the oil inlet bore (20) outlet opening and the oil inflow duct (11, 12) inflow openings, and an oil collection chamber (5), are defined between the bearing sleeve (9) outer circumferential surface and the central housing section (3), said oil supply channel (4) and said oil collection chamber (5) being separated at the outer circumferential surface of the bearing sleeve (9) by a barrier, and
      axially spaced journal bearings are inserted in the inner cylindrical bore of the bearing sleeve (9), wherein the oil inlet bore (20), oil supply channel (4) and oil inflow ducts (11, 12) are in communication with the journal bearings, and
   wherein the bearing housing extends axially between a compressor end and a turbine end, and wherein the bearing sleeve (9) extends axially in the direction of the turbine beyond the turbine end of the bearing housing (1).

2. The bearing housing (1) as claimed in claim 1, wherein the bearing sleeve (9) is substantially cylindrical and of constant diameter to the extent housed in the bearing housing (1).

3. A bearing housing (1) of an exhaust-gas turbocharger, with
   a compressor-side housing flange (2),
   a turbine-side housing flange (7), and
   a central housing section (3) which is integrally connected to the compressor-side housing flange (2) and turbine-side housing flange (7), and in which an oil inlet bore (20) having a single inlet opening and a single outlet opening is arranged; wherein
      a bearing sleeve (9), having an outer circumferential surface, an inner cylindrical bore, and oil inflow ducts (11, 12), each oil inflow duct having a single inlet opening and a single outlet opening, as a separate component is inserted into the central housing section (3) and fixed against rotation
      an axially extending oil supply channel (4) in communication with the oil inlet bore (20) outlet opening and the oil inflow duct (11, 12) inflow openings, and an oil collection chamber (5), are defined between the bearing sleeve (9) outer circumferential surface and the central housing section (3), said oil supply channel (4) and said oil collection chamber (5) being separated at the outer circumferential surface of the bearing sleeve (9) by a barrier, and
      axially spaced journal bearings are inserted in the inner cylindrical bore of the bearing sleeve (9), wherein the oil inlet bore (20), oil supply channel (4) and oil inflow ducts (11, 12) are in communication with the journal bearings, and
      a water chamber (10) is provided which is separate from the oil chamber (5) and which is delimited by the central housing section (3) and the bearing sleeve (9).

4. The bearing housing (1) as claimed in claim 3, wherein the water chamber (10) is of semi-circular design.

5. The bearing housing (1) as claimed in claim 3, wherein the water chamber (10) is provided with two water ports (13, 14).

6. The bearing housing (1) as claimed in claim 3, wherein the water chamber (10) has only one water port (13).

7. A bearing housing (1) of an exhaust-gas turbocharger, with
   a compressor-side housing flange (2),
   a turbine-side housing flange (7), and
   a central housing section (3) which is integrally connected to the compressor-side housing flange (2) and turbine-side housing flange (7), and in which an oil inlet bore (20) having a single inlet opening and a single outlet opening is arranged; wherein
      a bearing sleeve (9), having an outer circumferential surface, an inner cylindrical bore, and oil inflow ducts (11, 12), each oil inflow duct having a single inlet opening and a single outlet opening, as a separate component is inserted into the central housing section (3) and fixed against rotation
      an axially extending oil supply channel (4) in communication with the oil inlet bore (20) outlet opening and the oil inflow duct (11, 12) inflow openings, and an oil collection chamber (5), are defined between the bearing sleeve (9) outer circumferential surface and the central housing section (3), said oil supply channel (4) and said oil collection chamber (5) being separated at the outer circumferential surface of the bearing sleeve (9) by a barrier, and
      axially spaced journal bearings are inserted in the inner cylindrical bore of the bearing sleeve (9), wherein the oil inlet bore (20), oil supply channel (4) and oil inflow ducts (11, 12) are in communication with the journal bearings, and
   a heat decoupling chamber (25) is provided
   which, at its end pointing toward the shaft (16),
   is closed off by the bearing sleeve (9).

\* \* \* \* \*